106. COMPOSITIONS, COATING OR PLASTIC.
96

Patented May 22, 1934                        1,959,586

UNITED STATES PATENT OFFICE 1,959,586

WATERPROOF COMPOSITION AND PROCESS OF PRODUCING SAME

Lester Kirschbraun, Leonia, N. J., assignor, by mesne assignments, to The Patent and Licensing Corporation, New York, N. Y., a corporation of Massachusetts No Drawing. Application July 19, 1929, Serial No. 379,579

2 Claims. (Cl. 134—1)

This application is a continuation in part of my copending application Serial No. 178,147 filed March 24th, 1927.

This invention relates to the production of waterproof compounds suitable for use in various capacities. More particularly, the present invention has for one of its objects, the production of a compound in the nature of an asphalt plastic in which the wear-resisting properties of asphalt are increased without sacrificing any of the waterproofing qualities thereof.

Another object of the invention resides in the production of a compound of this character which can be applied by means of a brush or spray in much the same manner as paint or similar coatings are applied, and which when dry will form a tough waterproof coating possessing certain other advantages hereinafter to be pointed out.

In accordance with the present invention, I combine a dispersion of a bituminous substance with hydraulic cement. In carrying out the invention I first prepare a dispersion of the character indicated by liquefying by means of heat an asphalt of say 100 to 190 degrees F. melting point, and introduce this molten asphalt into an emulsifying apparatus simultaneously with the introduction thereto of a dispersing means which preferably takes the form of an aqueous mixture of clay-like material. The emulsifying apparatus is provided with suitable agitating means whereby the binder and the aqueous mixture may be thoroughly mixed to effect dispersion of the asphaltic material in the aqueous suspension.

The foregoing brief description of the manner of producing the dispersion represents a continuous type of operation. It should be understood however, that the bituminous material may be dispersed in a batch process by introducing molten asphalt into the aqueous suspension of the clay-like material, the whole mass being constantly agitated as the asphalt is added thereto. The dispersion as produced by either type of operation should comprise 50%–65% of asphalt, the remainder of the dispersion being the aqueous vehicle and dispersive media.

It should be understood that while the foregoing description has reference to asphalt as the bituminous material dispersed, and to clay or clay-like material as the dispersing media, the invention is not limited to this type of dispersion and may be carried out with equal facility when using aqueous dispersions in which the material dispersed and the dispersive media are other than those specified. Thus, the dispersing media may comprise colloidal oxides, powdered metallic hydroxides and silicates, casein, organic and inorganic paste-forming powders, and the like, which do not prevent setting of the hydraulic cement or which are not broken by the electrolyte in the cement. The material dispersed may include asphalt either of the natural or artificial variety, vegetable or animal pitches, resins, or fluxed mixtures of these materials with oils of a hydrocarbon nature. The selection of the particular bituminous material to be dispersed, and the dispersing media, are generally governed by the availability of the particular material, although the final dispersion should satisfy the requirement that it be of sufficiently stable character or capable of being stabilized to permit the incorporation therewith of substantial quantities of the hydraulic cement.

It will be found that dispersions produced by either of the modes herein described, and using material such as those specified, will be characterized by that degree of stability which will enable incorporation of substantial quantities of a cementitious material such as Portland cement without affecting the stability of the dispersion. The plastic thus produced by the admixture of the cementitious material with the dispersion, can be applied while in a cold state, and when permitted to dry will give rise to a product having substantial toughness, rendering the same highly useful in various arts.

The preferred method of preparing the composition is to make up a relatively thick slurry of Portland cement with water and then mix this with the dispersion by introducing the dispersion into the slurry, immediately prior to use. Care should be taken that there are no lumps of cement not thoroughly broken down and disintegrated so that the slurry will have the consistency of a smooth cream. The presence of powdery lumps in the slurry is objectionable for the reason that these lumps will, upon subsequent drying of the composition, appear in the final film. The quantity of Portland cement which may be compounded with the dispersion will vary in accordance with the use to which the product is applied, from proportions of say 4 to 7 parts of emulsion by volume to 1 part by volume of dry cement, the larger proportions of cement giving greater toughness. It should be observed, however, that quantities in excess of those compatible with the production of a plastic non-rigid film are to be avoided.

In one mode of carrying out the present invention with 120 degrees F. penetration asphalt for example, I prefer to use about 20% of Portland cement on the basis of weight of the dispersion used. This proportion is however, illustrative and is not to be regarded, in any sense, limiting. The object to be had in mind in any case, however, is to have sufficient binder present in the water-free film so that the latter possesses the elasticity and toughness of a bituminous composition rather than the characteristic rigidity of a hydraulic cement composition.

The best explanation of the causes which give rise to the peculiar toughness of the water-free film that can now be given may not be entirely accurate, but it seems that this toughness may be attributed to the fact that the Portland cement occupies the interstitial spaces between the asphalt particles, and as the water evaporates and combines after application, this cement concentrates into the interstitial spaces forming film-like coverings about the particles so as to produce in effect, a honey-comb structure. This structure upon setting must not contain sufficient cement to prevent permeation or coalescence of asphalt particles through the network of cement, but should have present quantities sufficient to add, by the hydraulic action thereof, to the structural toughness of the final product. If too much cement or too little dispersion is present in the composition, the product has the properties of a cement structure, that is rigid, and without plasticity, although waterproof to some degree. Such a composition and proportions giving rise thereto are to be avoided in accordance with the present invention.

The product is further characterized by its great ability to resist flow under heat at temperatures substantially above the melting point of the bitumen used. Likewise the tendency for the cement to come to the surface of the applied film results in a structure having a non-tacky surface, of a dark gray color, and possessing great superficial toughness, and yet sufficient adhesiveness to provide a proper bond between the film and the surface to which it is applied. This condition gives the effect when the film is dry, of a tough rind on the more plastic underbase or sub-surface material.

It will be seen that by virtue of adopting such proportions, a relatively thick film can be maintained as a protective structure in which the desirable properties of low melting point asphalt or coal tar can be employed while at the same time maintaining the necessary dryness of surface, resistance to flow under heat, and toughness sufficient to withstand mechanical injury.

The compound prepared as hereinabove described may be applied in the form of a coating to any surface which it is desired to waterproof. While the material may be applied in various ways to form the coating, it is one of the features of the present invention that the compound lends itself very readily to application by means of a brush or a spray, in a manner similar to the application of a coating of paint. The material is sufficiently fluid, or can be made so by the addition of water, to permit its being spread or built up to any desired thickness. When a layer of sufficient thickness for the desired purpose has been built up or otherwise applied, sufficient time is allowed for the evaporation of that portion of the water which does not enter into combination with the hydraulic cement, with the result that the Portland cement-asphalt mixture will dry to a tough and somewhat resilient coating. This coating is further characterized by the alkaline nature imparted thereto by the lime and other alkaline constituents of the cement, and this feature may be taken advantage of in one use to which the product of the present invention may be put, namely in the coating of pipes or similar surfaces where it is desirable, or essential, that the surface possess rust-inhibitive as well as waterproofing qualities. It will be found that marked rust-inhibitive properties will be imparted to the surface by virtue of the alkaline character of the product due to the presence of the lime constituents in the cement. When applied to steel surfaces, this rust-inhibiting property appears to be well defined when the hydrogen ion concentration is at a value above 9.0, and hence where the pH of the product is below this value, it may, in some instances, be desirable to bring the hydrogen ion concentration to such value by the addition of alkali, in order to provide the maximum rust inhibitive characteristics. Generally, however, when at least 20% of the cement is combined with the emulsion this adjustment of the pH will not be necessary, and the coating itself will provide sufficient alkalinity to impart well marked rust-inhibitive characteristics.

The product of the present invention is particularly suitable for coating pipes buried underground, since the toughness due to the Portland cement serves to increase the wear-resisting qualities of the otherwise soft coating and enable it more securely to withstand abrasion and the weight of the material below which it is imbedded.

I claim as my invention:

1. A waterproofing composition consisting of an aqueous dispersion of bituminous material admixed with hydraulic cement, the character and proportion of said cement being such as to render the composition capable of setting, upon application, to a tough, non-rigid plastic film, the proportion of said cement being between ¼ and ⅐ the amount of dispersion by volume.

2. A waterproofing composition consisting of an aqueous clay-type dispersion of bituminous material admixed with Portland cement, the character and proportion of said cement being such as to render the composition capable of setting, upon application, to a tough, non-rigid plastic film, the proportion of said cement being between ¼ and ⅐ the amount of dispersion by volume.

LESTER KIRSCHBRAUN.